US006327053B1

(12) United States Patent
Meng

(10) Patent No.: US 6,327,053 B1
(45) Date of Patent: *Dec. 4, 2001

(54) FACSIMILE SIGNAL TRANSMISSION WITH SUPPRESSION OF MULTIPLE MODULATION AND DEMODULATION ACROSS A CONNECTION

(75) Inventor: Zaiqing Meng, Kanata (CA)

(73) Assignee: Nortel Networks Limited (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/989,647

(22) Filed: Dec. 12, 1997

(51) Int. Cl.⁷ .............................. H04N 1/00; H04N 1/32; H04B 1/38; H04L 5/16
(52) U.S. Cl. ........................ 358/434; 358/442; 358/468; 375/222
(58) Field of Search ................... 358/434, 400, 358/404, 406, 442, 468, 440; 375/222; 379/100.01; 370/255, 265, 270, 271; 455/78, 553, 557

(56) References Cited

U.S. PATENT DOCUMENTS

| 4,668,994 | 5/1987 | Takahashi et al. ............ 358/256 |
| 4,924,480 | 5/1990 | Gay et al. ...................... 375/8 |
| 4,961,185 | * 10/1990 | Sawada ......................... 370/79 |
| 5,210,826 | * 5/1993 | Takeda et al. ................. 358/442 |
| 5,216,519 | 6/1993 | Daggett et al. ............... 358/434 |
| 5,220,560 | * 6/1993 | Ogasawara .................... 370/79 |
| 5,249,218 | * 9/1993 | Sainton ......................... 379/59 |
| 5,268,770 | 12/1993 | Yukino .......................... 358/435 |
| 5,307,174 | * 4/1994 | Saito ............................. 358/400 |
| 5,418,628 | 5/1995 | Perkins ......................... 358/468 |
| 5,461,488 | 10/1995 | Witek ........................... 358/402 |
| 5,585,938 | 12/1996 | Imamura ....................... 358/434 |
| 5,711,012 | * 1/1998 | Bottoms et al. ............... 455/557 |
| 5,742,639 | * 4/1998 | Fasulo, II et al. ............. 375/219 |
| 5,751,796 | * 5/1998 | Scott ............................. 379/93.31 |
| 5,752,199 | * 5/1998 | Scott ............................. 455/557 |
| 5,784,633 | * 7/1998 | Petty ............................ 395/880 |
| 5,878,078 | * 2/1999 | Griffin et al. ................. 375/222 |
| 5,966,663 | * 10/1999 | Gleason ........................ 455/466 |

FOREIGN PATENT DOCUMENTS

| 0 478 205 A2 | 4/1992 | (EP) . |
| 0 494 687 A2 | 7/1992 | (EP) . |
| 0 714 186 A2 | 5/1996 | (EP) . |

OTHER PUBLICATIONS

Tomcik et al., "Facsimile Compression Through Demodulation in Packet Networks," *IEEE*, pp. 1699–1703 (1992).
European Search Report, dated Mar. 29, 2000.
ITU–T Recommendation T.30: Terminal Equipments and Protocols for Telematic Services: Procedures for Document Facsimile Transmission in the General Switched Telephone Network (Mar. 1993).

* cited by examiner

Primary Examiner—Kimberly A. Williams
(74) Attorney, Agent, or Firm—Finnegan, Henederson, Farabow, Garrett & Dunner, L.L.P.

(57) ABSTRACT

An apparatus for suppressing multiple modulation and demodulation of a facsimile signal in a digital telecommunications network. The apparatus either modulates/demodulates or passes through a facsimile message according to a protocol in the message.

39 Claims, 5 Drawing Sheets

FACSIMILE SIGNAL TRANSMISSION WITH SUPPRESSION OF MULTIPLE MODULATION AND DEMODULATION ACROSS A CONNECTION

FIELD OF THE INVENTION

The present invention relates to a system and method for suppressing multiple modulation and demodulation of a facsimile signal in a telecommunications network.

BACKGROUND OF THE INVENTION

In a telecommunications network, digital private branch exchanges (PBXs) are interconnected by pairs of modulator-demodulator (mod-demod) machines for use in transmitting facsimile (fax) signals. The mod-demod machines provide for a savings in bandwidth and thus transmission cost by demodulating a fax signal down to a baseband level before passing it across connections in the network and by subsequently remodulating the signal for transmission to a PBX. In particular, one mod-demod machine of each tandem pair demodulates a 64 k bits per second (bps) pulse code modulation (PCM) signal down to a baseband level for transmission to other mod-demod machines in the network. The other mod-demod machine of the pair remodulates the baseband signal back to a 64 k bps PCM signal for subsequent transmission in the network.

Unfortunately, modulation and demodulation introduce distortion and delay into a signal, and when a signal is subjected to repeated modulation and demodulation cycles, each cycle adds distortion and delay. Repeated modulation and demodulation of a fax signal often results when a connection established within a telecommunications network includes more than one PBX. The increased amount of distortion resulting from repeated modulation and demodulation is undesirable, as it may result in a loss of data or errors in transmitted data.

Accordingly, a need exists for an improved method of transmitting fax signals in a digital communications network.

SUMMARY OF THE INVENTION

A mod-demod machine consistent with the present invention receives a protocol message related to a fax signal and places itself in a mode in response to the protocol message. The mod-demod machine also receives the fax signal and processes the fax signal according to the mode.

A method consistent with the present invention for transmitting a fax signal through a mod-demod machine receives a protocol message related to a fax signal and places the mod-demod machine in a mode in response to the protocol message. The method receives the fax signal and processes the fax signal according to the mode.

An article of manufacture consistent with the present invention for controlling modulation and demodulation of a fax signal transmitted through a network with multiple mod-demod machines includes a computer-readable medium with computer-readable information. The information includes a protocol message for transmitting an associated fax signal, and the protocol message includes a computer-readable mode signal for use by a mod-demod machine in controlling modulation and demodulation of the associated fax signal.

DETAILED DESCRIPTION

An apparatus consistent with the present invention suppresses multiple modulation and demodulation operations of a fax signal in a digital telecommunications network. The apparatus includes an alternate transmission mode providing for the suppression. The mode, referred to as a tandem pass-through (TPT) mode, has a mod-demod machine that transmit a fax signal as is, without demodulation or remodulation. In that alternate mode, a network preferably performs only one modulation and demodulation cycle across the connection between the originating and destination fax machines to minimize distortion and delay.

A mod-demod machine implements this alternate mode by inserting a signal or code into the fax protocol messages transmitted between two fax machines. It uses a known fax protocol to carry the mod-demod information across a connection in a fax communication for suppressing multiple modulation and demodulation. This known protocol was established by the Telecommunication Standardization Sector of the International Telecommunication Union (ITU-T) and is known as ITU-T Recommendation T.30: Terminal Equipment and Protocols for Telematic Services; Procedures for Document Facsimile Transmission in the General Switched Telephone Network (March 1993), and is incorporated herein by reference.

Digital Telecommunications Network

Figure 1:
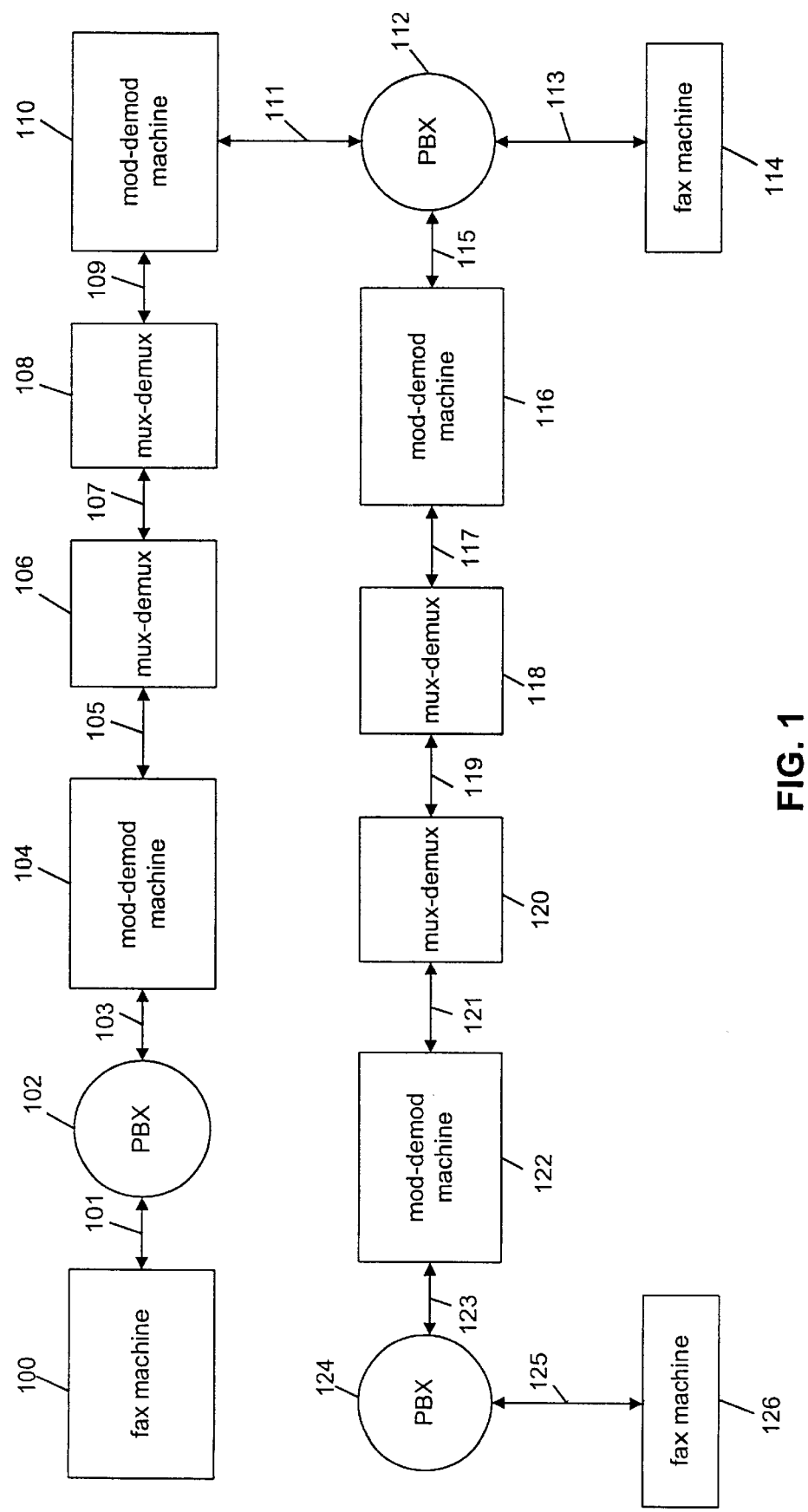
FIG. 1 is a diagram of an exemplary telecommunications network.

FIG. 1 is a diagram of an exemplary digital telecommunications network. It includes fax machines 100, 114, and 126, digital PBXs 102, 112, and 124, mod-demod machines 104, 110, 116, and 122, multiplexer-demultiplexer (mux-demux) machines 106, 108, 118, and 120. Fax machines 100, 114, and 126 are connected with PBXs 102, 112, and 124, respectively, for routing their signals through the network. The PBXs typically transmit process the signals as PCM signals.

PBXs 102 and 112 are interfaced by mod-demod machine pair 104 and 110, which may demodulate a PCM signal to a baseband level for transmission to a mux-demux machine, and remodulate a baseband level signal to a PCM signal for transmission to a PBX. Mux-demux pair 106 and 108 receive the demodulated signal and perform multiplexing and demultiplexing of the signal, typically to save bandwidth along a particular transmission path. PBXs 112 and 124 are likewise interfaced by mod-demod machine pair 116 and 122, which may demodulate a PCM signal to a baseband level for transmission to a mux-demux machine and remodulate a baseband level signal to a PCM signal for transmission to a PBX. Mux-demux pair 118 and 120 receive the demodulated signal and perform multiplexing and demultiplexing of the signal.

The connections between components provide for various types of signal transmission. In particular, the connections 105, 109, 117, and 121 between a mod-demod machine and a mux-demux machine represent a low bit rate demodulated fax signal such as a 9600 bps signal. The connections 101, 103, 111, 113, 115, 123, and 125 interfacing the PBX's represent, for example, a 64 k bps signal. Finally, the connections 107 and 119 between the mux-demux machines represent a high bit rate signal such as a high speed telecommunication facility signal. Examples provided below explain fax signal transmission through this network.

Frame Structure for Fax Transmission Protocol

Figure 2:
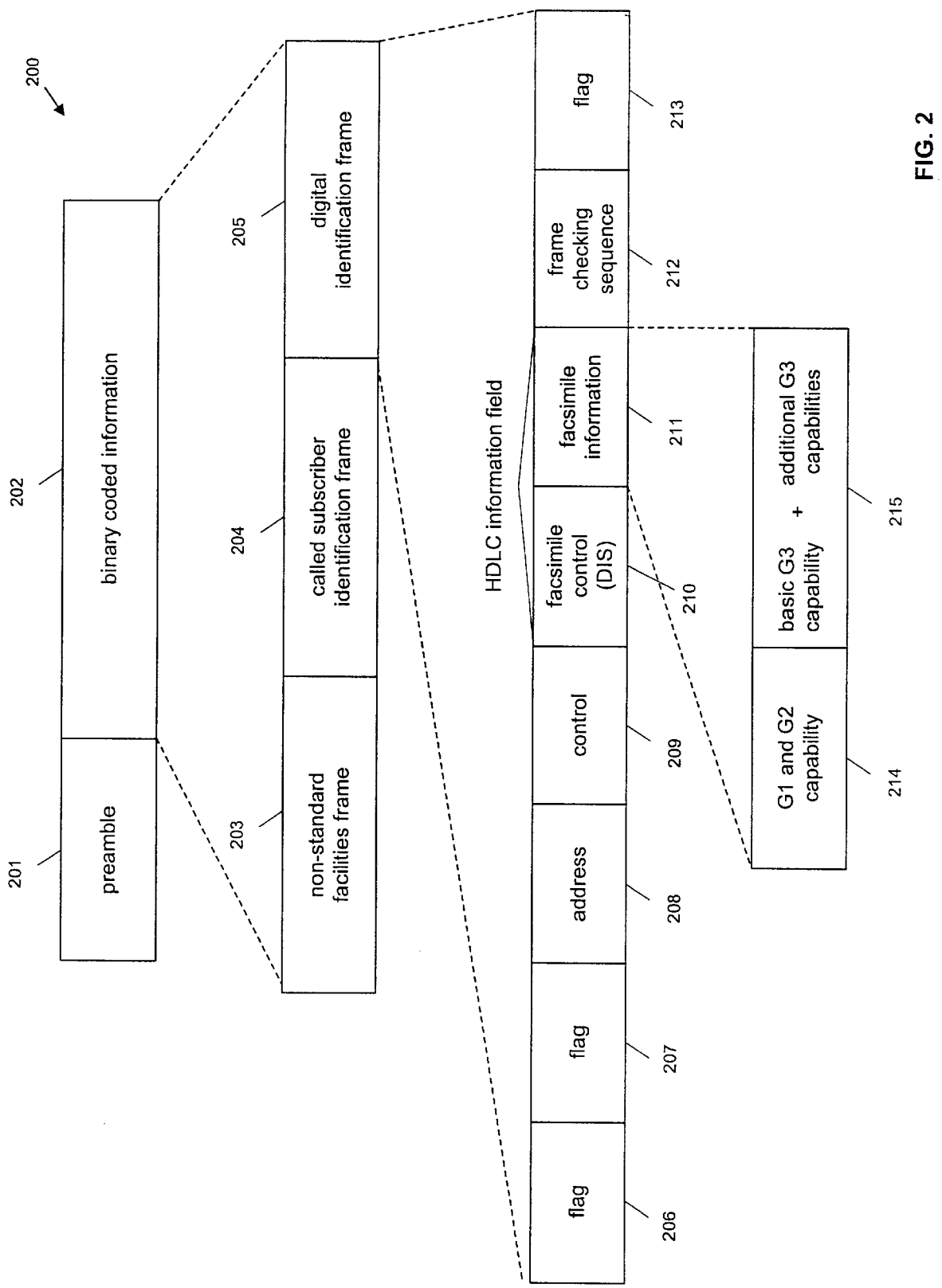
FIG. 2 is a diagram of a frame structure for use in transmitting fax information according to International Telecommunication Union, Telecommunication Standardization Sector, Recommendation T.30.

FIG. 2 is a diagram of a fax frame structure protocol according to ITU-T Recommendation T.30. Machines in a network may transmit protocol messages according to this protocol for transmitting related fax signals. Frame structure 200, referred to as a high level data link control (HDLC) frame structure, contains several frames, including a preamble 201 and a binary coded information frame 202. Preamble 201 precedes binary coded signaling when a new transmission of information begins in any direction. It ensures that all elements of the communication channel (e.g., echo suppressors) are properly conditioned so that subsequent data may pass unimpaired. Binary coded information frame 202 includes a non-standard facilities (NSF) frame 203, a called subscriber identification frame 204, and a digital identification frame 205.

NSF frame 203 includes optional user-defined information for specific user requirements not covered by the T.30standard. As this frame is a non-standard frame, the information within it is not required for transmission according to ITU-T Recommendation T.30. NSF frame 203 preferably includes a signal or code identifying a working mode of a particular mod-demod machine. That mode signal or code encompasses any type of computer-readable identification of a working or operational mode. It may identify an alternate TPT mode by using, for example, a digitized number, preferably a number not used by the ITU-T Recommendation T.30. Other numbers may also be used to identify other possible working modes.

Called subscriber identification frame 204 includes an optional signal that may be used to provide the specific identity of a called subscriber by its international telephone number. Digital identification frame 205 includes several fields. Flag fields 206, 207 and 213 are an eight-bit HDLC flag sequence used to denote the beginning and end of the frame. For the fax transmission procedure, the flag sequence is used to establish bit and frame synchronization. The trailing flag of one frame may also be the leading flag of the following frame. Continued transmission of the flag sequence may be used, for example, to signal to a distant fax machine that the machine remains on-line but is not presently prepared to proceed with the fax transmission procedure. Address field 208 provides for identification of specific fax machines in a multi-point arrangement. Control field 209, an eight-bit HDLC field, provides the capability of encoding the commands and responses unique to the fax control procedures.

The HDLC information field includes fields 210 and 211. Fax control field 210 is defined as the first eight or sixteen bits of the HDLC information field, and it contains the complete information concerning the type of information being exchanged and the position of the overall sequence. Fax control field 210 includes a digital identification signal (DIS), characterizing the standard capabilities of the called fax machine. Variable length fax information field 211 contains specific information for the control and message interchange between two fax machines. Frame checking sequence field 212 is used for error detection and correction. Fax information field 211 includes field 214 identifying group 1 or group 2 modulation capabilities within a particular network and a field 215 identifying basic and additional group 3 modulation capabilities. These group modulation capabilities are defined in ITU-T Recommendation T.30.

Components in a network, including fax machines and mod-demod machines, may include a computer-readable medium, such as a computer memory, for storing this protocol and the information in its frames or storing other protocols. The components may then modify the protocol by, for example, inserting information into the NSF frame for subsequent transmission and communication of working modes.

Process for Suppressing Multiple Modulation and Demodulation

Figure 3:
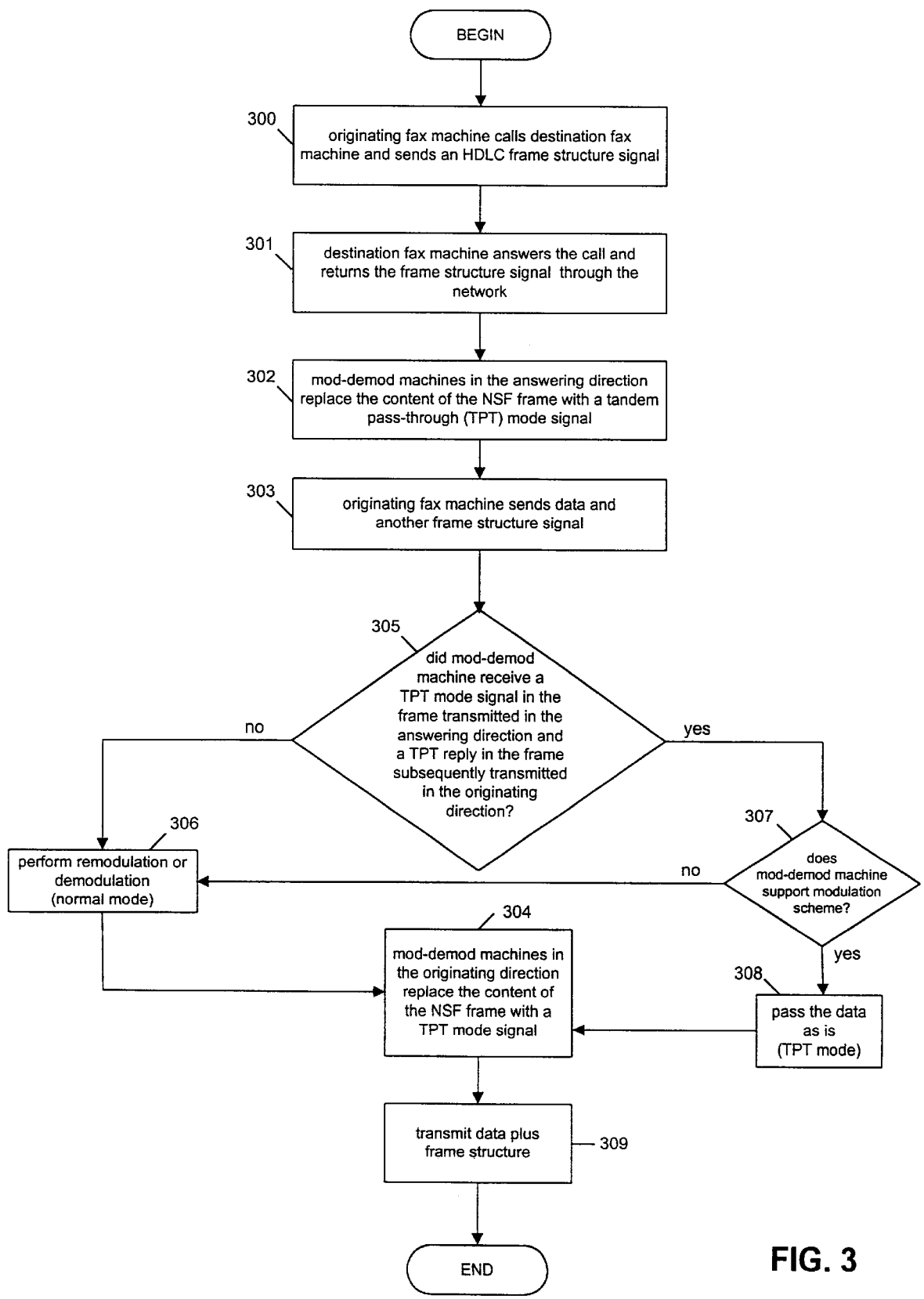
FIG. 3 is a flow chart of a process for transmitting a fax signal with suppression of multiple modulation and demodulation across a connection.

FIG. 3 is a flowchart of a process for suppressing multiple modulation and demodulation across a connection in a digital telecommunications network. This example of such a process uses the fax protocol as defined by ITU-T Recommendation T.30. It is possible to use a protocol unique to a particular type of fax machine, but one advantage of using the T.30 protocol is that it works with fax machines that may not be compatible.

The process begins with the initial negotiation or handshaking sequence between the originating and destination fax machines. At step 300, the originating fax machine calls a destination fax machine and sends a protocol message or an HDLC frame structure signal, described above. The destination fax machine answers the call and returns the frame structure signal through the network (step 301). As the frame structure signal travels through the network, mod-demod machines in the answering direction replace the content of the NSF frame with codes indicating a TPT working mode (step 302).

After this initial negotiation, the originating fax machine sends the fax data and another frame structure signal (step 303). Because of the initial negotiation including the information in the NSF frame, each mod-demod machine can determine whether to operate in TPT mode or in a normal mode.

Next, the mod-demod machines in the originating direction receive the transmitted data plus frame structure and replace the content of the NSF frame with codes indicating a TPT mode for transmission of the fax data (step 309). As the data is transmitted, each mod-demod machine determines a working mode by examining the NSF frame (step 305). In particular, it determines its working mode by first determining if it received a TPT mode signal in both the answering direction when the fame structure signal was returned and again in the originating direction when another frame structure signal was transmitted along with the fax data (step 305). If it did not receive TPT mode signals in both directions, it operates in a normal mode and performs a modulation or demodulation depending upon where it is in the network (step 306), and it transmits the data plus frame structure including a TPT mode signal in the NSF frame for the next mod-demod machine in the network (step 309).

If the mod-demod machine did receive TPT mode signals in both directions, it next determines if it supports the modulation scheme in the network (step 307). It may determine the modulation scheme by examination of particular frames in the protocol, as described above. If it does not support that scheme, it reverts to a normal mode and performs modulation or demodulation (step 306). Otherwise, it operates in a TPT mode, passing the data as is without modulation or demodulation (step 308), and transmitting the data plus frame structure with a TPT mode signal in the NSF frame to the next element in the network (step 309).

Examples of Fax Signal Transmission

Consider as an example transmitting a fax signal from fax machine 126 through the network shown in FIG. 1 to fax machine 100. In this example, fax machine 126 transmits a frame structure signal through the network to fax machine 100. Fax machine 100 answers by sending a frame structure signal back to fax machine 126. When fax machine 100 answers, the mod-demod machines in the answering direction, machines 104, 110, 116, and 122, insert into the NSF frame a TPT mode signal. Fax machine 126 then sends the fax data along with another frame structure in the originating direction. Mod-demod machine 122 demodulates the data in the originating direction before transmitting it to mux-demux 120. Mod-demod machines 110 and 116 operate in a TPT mode, assuming they support the network modulation scheme, as they are between mod-demod machines 104 and 122. Therefore, they need not remodulate the fax information signal, and they transmit the data as is to PBX 112 and mux-demux 108. In this manner, mod-demod machines 104 and 122 act essentially as a tandem pair, while mod-demod machines 110 and 116 operate in a TPT mode.

Figure 4:
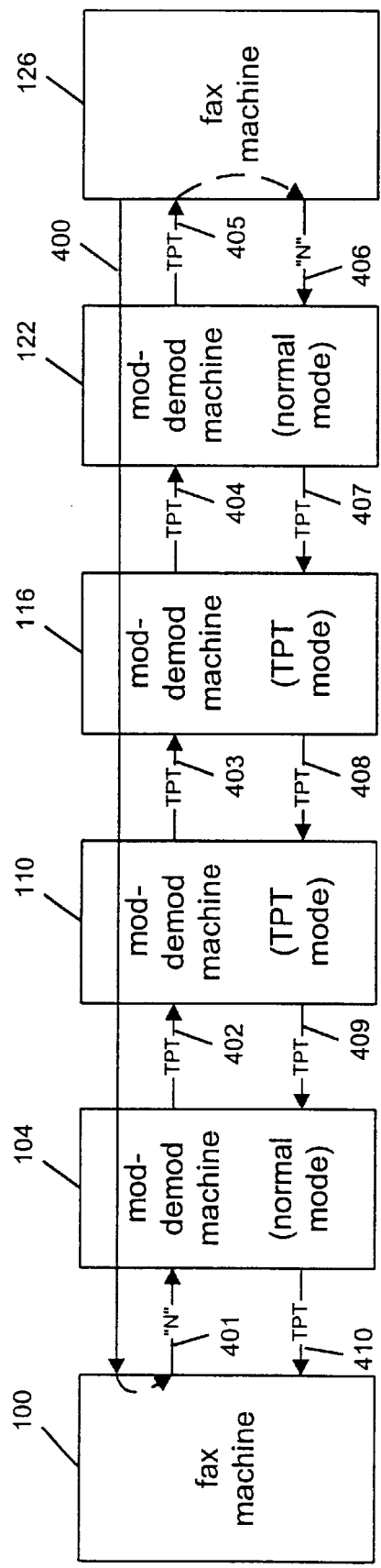
FIG. 4 is a diagram showing the steps of transmitting a fax signal in a network having mod-demod machines operating in alternate and normal modes.

FIG. 4 is a diagram showing more specifically how the mod-demod machines in this example modify the transmitted frame signal. Fax machine 126 initially transmits a frame structure signal 400 to fax machine 100 as part the negotiation sequence. Fax machine 100 returns a frame structure signal 401, at which point the NSF frame structure typically contains no working mode information. Signal 401 is shown as a normal mode signal (N) in quotes, meaning that the signal transmitted by the fax machine would typically contain no working mode signal, and a mod-demod machine would interpret that signal as a normal mode.

Mod-demod machine 104 inserts a TPT mode signal 402 into the NSF frame and transmits the frame structure signal to mod-demod machine 110. Mod-demod machine 110 stores information identifying that it received a TPT mode signal in the answering direction, and it also inserts a TPT mode signal 403 into the NSF frame and transmits the frame structure signal to mod-demod machine 116. Mod-demod machines 116 and 122 likewise store an indication of the received TPT mode signal and insert their own TPT mode signals 404 and 405, respectively, into the NSF frame transmitted in the answering direction.

Fax machine 126 then returns another frame structure signal 406 along with the fax data. Mod-demod machine 122 receives that signal, which typically contains no working mode information in the NSF frame. Because mod-demod machine 122 did not receive a TPT mode signal, it operates in normal mode, demodulating the transmitted data. It also inserts a TPT mode signal 407 into the NSF frame transmitted in the originating direction with the fax data. Mod-demod machine 116 receives the frame structure signal including the TPT mode signal 407. Because mod-demod machine 116 received a TPT mode signal in both the answering and originating directions (signals 403 and 407, respectively), it operates in a TPT mode, assuming that it supports the network modulation scheme. It may determine such support from other frames in the frame structure signal, as described above.

Mod-demod machine 116 also inserts a TPT mode signal 408 into the NSF frame of the signal it transmits to mod-demod machine 110. Mod-demod machine 110 also operates in a TPT mode, having received TPT mode signals in the answering and originating direction (signals 402 and 408, respectively). It also inserts a TPT mode signal 409 into the NSF frame of the signal it transmits to mod-demod machine 104. Mod-demod machine 104 determines that, although it received a TPT mode signal 409 in the originating direction, it did not receive a TPT mode signal in the answering direction. Rather, it received signal 401 from fax machine 100, which included no such code in the NSF frame. Therefore, mod-demod machine 104 operates in normal mode, remodulating the fax signal before transmitting it to fax machine 100. It also inserts a TPT mode signal 410 in the NSF frame of the signal it transmits.

Consider as a second example transmission of a fax signal from fax machine 126 to fax machine 114. In this example, fax machine 126 sends a frame structure signal to fax machine 114 as part of the negotiation sequence. Fax machine 114 replies with a frame structure signal, and in the answering direction mod-demod machines 116 and 122 insert in the NSF frame TPT mode signals. Fax machine 126 then transmits the data and another frame structure signal. In this example, there are no intervening mod-demod machine pairs between mod-demod machines 116 and 122. Accordingly, both of those machines operate in a normal mode. Mod-demod machine 122 demodulates the fax signal from fax machine 126, and mod-demod machine 116 remodulates the fax signal before transmitting it to PBX 112 and fax machine 114.

Figure 5:
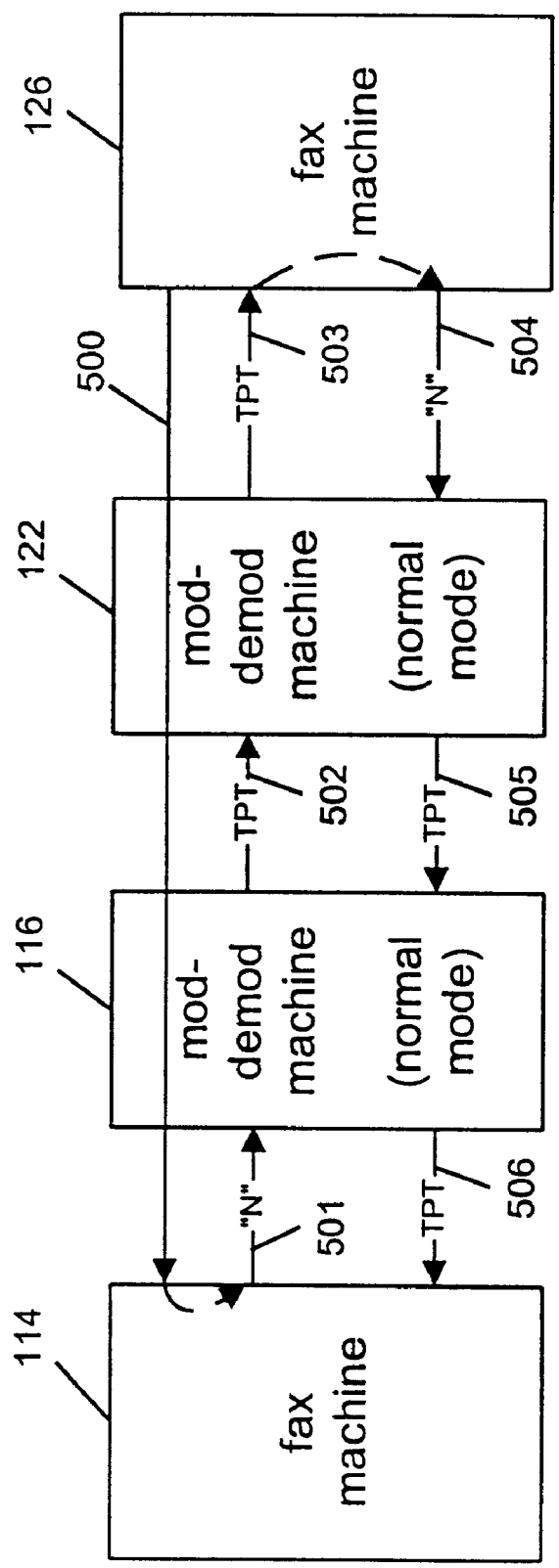
FIG. 5 is a diagram showing the steps of transmitting a fax signal in a network having mod-demod machines operating in a normal mode.

FIG. 5 is a diagram showing more specifically how the mod-demod machines in this example modify the transmitted frame structure signal. Fax machine 126 initially transmits a frame structure signal 500 to fax machine 114 as part the negotiation sequence. Fax machine 114 returns a frame structure signal 501, at which point the NSF frame structure typically contains no working mode information, indicating a normal working mode. Mod-demod machine 116 inserts a TPT mode signal 502 into the NSF frame and transmits the frame structure signal to mod-demod machine 122. Mod-demod machine 122 stores information identifying that it received a TPT mode signal in the answering direction, and it also inserts a TPT mode signal 503 into the NSF frame and transmits the frame structure signal to fax machine 126.

Fax machine 126 then returns another frame structure signal 504 along with the fax data. Mod-demod machine 122 receives that signal, which typically contains no working mode information in the NSF frame, indicating a normal working mode. Because mod-demod machine 122 did not receive a TPT mode signal, it operates in normal mode, demodulating the transmitted data. It also inserts a TPT mode signal 505 into the NSF frame transmitted in the originating direction with the fax data. Mod-demod machine 116 receives the frame structure signal including the TPT mode signal 505. Although mod-demod machine 116 received TPT mode signal 505 in the originating direction, it received no TPT mode signal in the answering direction. Rather, it received signal 501 indicating a normal mode. Accordingly, mod-demod machine 116 remodulates the fax signal before transmitting it to fax machine 114. Mod-demod machine 116 also includes a TPT mode signal 506 in the frame structure signal that it transmits. Accordingly, when a mod-demod machine receives TPT mode signals in both the answering and originating directions, it knows that it may operate in TPT mode. This type of handshaking essentially involves receiving a TPT mode signal in one direction of protocol transmission and operating in a TPT mode if a reply TPT mode signal is received in the other direction.

While the present invention has been described in connection with a preferred embodiment, many modifications will be readily apparent to those skilled in the art, and this application is intended to cover any adaptations or variations thereof. For example, various codes for the operating modes and different labels for the operating modes may be used without departing from the scope of the invention. Although the NSF frame within a standard fax protocol provides a convenient location for a code defining a working mode, it may be located in other frames or within an entirely different protocol. It is manifestly intended that this invention be limited only by the claims and equivalents thereof.

What is claimed is:

1. A modulator-demodulator machine for transmitting a facsimile signal through a network, comprising:
   receive means for receiving a protocol message related to a facsimile signal;
   means for determining from the protocol message whether multiple modulation and demodulation operations of the facsimile signal will occur in the network;
   means for placing the modulator-demodulator machine from a first mode to an alternate mode that suppresses the multiple modulation and demodulation operations of the facsimile signal;
   means for receiving the facsimile signal; and
   processing means for processing the facsimile signal according to the alternate mode.

2. The modulator-demodulator machine of claim 1 wherein the processing means includes:
   means for modulating the facsimile signal; and
   means for demodulating the facsimile signal.

3. The modulator-demodulator machine of claim 1 wherein the processing means includes:
   means for passing the facsimile signal as is.

4. The modulator-demodulator machine of claim 3, further comprising:
   means for determining if the modulator-demodulator machine supports a modulation scheme used in transmitting the facsimile signal, and
   wherein the processing means includes means for passing the facsimile signal as is if the modulator-demodulator machine supports the modulation scheme.

5. The modulator-demodulator machine of claim 1 wherein the receive means includes means for receiving the protocol message according to ITU-T Recommendation T.30.

6. The modulator-demodulator machine of claim 1 wherein the means for determining includes:
   means for inserting a code in response to the protocol message that indicates whether multiple modulation and demodulation operations of the facsimile signal will occur in the network.

7. The modulator-demodulator machine of claim 6 further comprising:
   means for analyzing the code to determine whether to perform one of a modulation operation and a demodulation operation.

8. A modulator-demodulator machine for transmitting a facsimile signal through a network, comprising:
   receive means for receiving
      a first protocol message transmitted in an answering direction and related to a facsimile signal, and
      a second protocol message transmitted in an originating direction and related to the facsimile signal;
   means for determining from the first protocol message and second protocol message whether multiple modulation and demodulation operations of the facsimile signal will occur in the network;
   means for placing the modulator-demodulator machine from a first mode to an alternate mode that suppresses the multiple modulation and demodulation operations of the facsimile signal;
   means for receiving the facsimile signal; and
   processing means for processing the facsimile signal according to the alternate mode.

9. The modulator-demodulator machine of claim 8 wherein the processing means includes:
   means for modulating the facsimile signal; and
   means for demodulating the facsimile signal.

10. The modulator-demodulator machine of claim 8 wherein the receive means includes means for receiving the protocol messages according to ITU-T Recommendation T.30.

11. The modulator-demodulator machine of claim 8 wherein the processing means includes
   means for passing the facsimile signal as is.

12. The modulator-demodulator machine of claim 11, further comprising:
   means for determining if the modulator-demodulator machine supports a modulation scheme used in transmitting the facsimile signal, and
   wherein the processing means includes means for passing the facsimile signal as is if the modulator-demodulator machine supports the modulation scheme.

13. The modulator-demodulator of claim 8 wherein the means for determining includes:
   means for inserting a code in response to the first protocol message and second protocol message that indicate whether multiple modulation and demodulation operations of the facsimile signal will occur in the network.

14. The modulator-demodulator machine of claim 13 further comprising:
   means for analyzing the code to determine whether to perform one of a modulation operation and a demodulation operation.

15. A system or transmitting and receiving a facsimile signal through a network including multiple modulator-demodulator machines, comprising:
   a plurality of modulator-demodulator machines coupled together in series in between a first fax machine and a second fax machine, the modulator-demodulator machines each comprising:
      receive means for receiving a protocol message related to a facsimile signal;
      means for determining from the protocol message whether multiple modulation and demodulation operations of the facsimile signal will occur in the network;
      means for placing the modulator-demodulator machine from a first mode to an alternate mode that suppresses the multiple modulation and demodulation operations of the facsimile signal;
      means for receiving the facsimile signal; and
      processing means for processing the facsimile signal according to the alternate mode.

16. The system of claim 15 wherein the processing means includes:
means for modulating the facsimile signal; and
means for demodulating the facsimile signal.

17. The system of claim 15 wherein the processing means includes
means for passing the facsimile signal as is.

18. The system of claim 17, further comprising:
means for determining if the modulator-demodulator machine supports a modulation scheme used in transmitting the facsimile signal, and
wherein the processing means includes means for passing the facsimile signal as is if the modulator-demodulator machine supports the modulation scheme.

19. The system of claim 15 wherein the receive means includes means for receiving the protocol message according to ITU-T Recommendation T.30.

20. The system of claim 15 wherein the means for determining includes:
means for inserting a code in response to the protocol message that indicates whether multiple modulation and demodulation operations of the facsimile signal will occur in the network.

21. The system of claim 20 wherein each modulator-demodulator machine further comprises:
means for analyzing the code to determine whether to perform one of a modulation operation and a demodulation operation.

22. A method for transmitting a facsimile signal through a modulator-demodulator machine comprising the steps of:
receiving a protocol message related to a facsimile signal;
determination from the protocol message whether multiple modulation and demodulation operations of the facsimile signal will occur in the network;
placing the modulator-demodulation machine form a first mode to an alternate mode that suppresses the multiple modulation and demodulation operations of the facsimile signal;
receiving the facsimile signal; and
processing the facsimile signal according to the alternate mode.

23. The method of claim 22 wherein the processing step includes the step of:
performing one of a modulation operation and a demodulation operation of the facsimile signal.

24. The method of claim 22 wherein the processing step includes the step of
passing the facsimile signal as is.

25. The method of claim 24, further comprising the step of
determining if the modulator-demodulator machine supports a modulation scheme used in transmitting the facsimile signal, and
wherein the processing step includes the step of passing the facsimile signal as is if the modulator-demodulator machine supports the modulation scheme.

26. The method of claim 22 wherein the step of receiving a protocol message includes the step of
receiving the protocol message according to ITU-T Recommendation T.30.

27. The method of claim 22 further comprising:
inserting a code in response to the protocol message that indicates multiple modulation and demodulation operations of the facsimile signal will occur in the network.

28. The method of claim 27 further comprising:
analyzing the code to determine whether to perform one of a modulation operation and a demodulation operation.

29. An article of manufacture for use in controlling modulation and demodulation of a facsimile signal transmitted through a network including multiple modulator-demodulator machines, comprising:
a computer readable medium having embodied thereon computer-readable information including a protocol message for transmitting an associated facsimile signal, the protocol message including a computer-readable mode signal for use by a modulator-demodulator machine in determination from the protocol message whether multiple modulation and demodulation operations of the associated facsimile signal will occur in the network and suppressing multiple modulation and demodulation operations of the associated facsimile signal by placing the modulator-demodulator machines from a first mode to an alternate mode.

30. The article of manufacture of claim 29 wherein
the computer-readable medium includes the protocol message structured according to ITU-T Recommendation T.30.

31. A modulator-demodulator machine for transmitting and receiving a signal through a network, comprising:
means for receiving a first protocol message from a destination machine;
means for receiving a second protocol message from an originating machine;
means for determining from the first protocol message and second protocol message whether multiple modulation and demodulation operations of the signal will occur in the network; and
means for placing the modulator-demodulator machine from a first mode to an alternate mode to suppress the multiple modulation and demodulation operations.

32. A method for transmitting a facsimile signal through a modulator-demodulator machine, comprising the steps of:
receiving
a first protocol message transmitted in an answering direction and related to a facsimile signal, and
a second protocol message transmitted in an originating direction and related to the facsimile signal;
determining from the first protocol message and second protocol message whether multiple modulation and demodulation operations of the facsimile signal will occur in the network;
placing the modulator-demodulator machine from a first mode to an alternate mode that suppresses the multiple modulation and demodulation operations of the facsimile signal;
receiving the facsimile signal; and
processing the facsimile according to the alternate mode.

33. The method of claim 32 wherein the processing step includes the step of:
performing one of a modulation operation and a demodulation operation of the facsimile signal.

34. The method of claim 32 wherein the processing step includes the step of
passing the facsimile signal as is.

35. The method of claim 34, further comprising the step of
- determining if the modulator-demodulator machine supports a modulation scheme used in transmitting the facsimile signal, and
- wherein the processing step includes the step of passing the facsimile signal as is if the modulator-demodulator machine supports the modulation scheme.

36. The method claim 32 wherein the step of receiving the protocol messages includes the step of
- receiving the protocol messages according to ITU-T Recommendation T.30.

37. The method of claim 32 further comprising:
- inserting a code in response to the first protocol message and second protocol message that indicates whether multiple modulation and demodulation operations of the facsimile signal will occur in the network.

38. The method of claim 37 further comprising:
- analyzing the code to determine whether to perform one of a modulation operation and a demodulation operation.

39. A modulator-demodulator machine for transmitting and receiving a signal through a network, comprising:
- means for determining whether multiple modulation and demodulation operations will occur in the network;
- means for suppressing the multiple modulation and demodulation operations by placing the modulator-demodulator machine from a first mode to an alternate mode of operation.

* * * * *